(12) United States Patent
Nitecki et al.

(10) Patent No.: US 6,279,386 B1
(45) Date of Patent: Aug. 28, 2001

(54) METER FOR MEASURING THE VOLUME OF A FLOWING FLUID

(75) Inventors: Jean-Pierre Nitecki, Buc; Patrick Siri, Abbeville, both of (FR)

(73) Assignee: Tokheim Services France, Le Plessis Robinson (FR)

( * ) Notice: Subject to any disclaimer, the term of this patent is extended or adjusted under 35 U.S.C. 154(b) by 0 days.

(21) Appl. No.: 09/201,583

(22) Filed: Nov. 30, 1999

(30) Foreign Application Priority Data

Nov. 28, 1997 (FR) .................................................. 97/15043

(51) Int. Cl.[7] ................ G01N 11/00; G01F 1/20
(52) U.S. Cl. ........................ 73/54.02; 73/861.19
(58) Field of Search .................... 73/861.19, 861.22, 73/54.01, 54.02, 54.05, 54.04, 54.11

(56) References Cited

U.S. PATENT DOCUMENTS

| 2,862,387 | * 12/1958 | Webster .................................. 73/198 |
| 3,410,138 | * 11/1968 | Lynch .................................... 73/197 |
| 4,050,304 | 9/1977 | Thomas . |
| 4,107,990 | * 8/1978 | Ringwall ............................ 75/861.19 |
| 4,610,162 | 9/1986 | Okabayashi et al. . |
| 5,291,780 | * 3/1994 | Thomas et al. ....................... 73/195 |

FOREIGN PATENT DOCUMENTS

| 26 44 302 | 4/1977 | (DE) . |
| 0 393 938 | 10/1990 | (EP) . |
| WO 93 18372 | 9/1993 | (WO) . |
| WO 97 22854 | 6/1997 | (WO) . |

\* cited by examiner

*Primary Examiner*—Harshad Patel
(74) *Attorney, Agent, or Firm*—Frishauf, Holtz, Goodman, Langer & Chick, P.C.

(57) ABSTRACT

A meter for measuring the volume of a flowing fluid includes a viscosensitive unit through which the fluid flows under laminar flow conditions, a first fluidic oscillator in series with the viscosensitive unit, and a second fluidic oscillator shunting at least the viscosensitive unit. The viscosensitive unit and the fluidic oscillators are adapted to determine the viscosity of the fluid so as to apply to the fluid volume measured by the fluidic oscillators a correction dependent on the Reynolds number.

6 Claims, 3 Drawing Sheets

METER FOR MEASURING THE VOLUME OF A FLOWING FLUID

FIELD OF THE INVENTION

The present invention concerns a meter for measuring the volume of a flowing fluid.

The invention finds a particularly advantageous application in the field of accurately measuring the volume of fluid delivered by a dispenser, in particular a fuel dispenser.

BACKGROUND OF THE INVENTION

Fuel dispensers are equipped with a unit for measuring the volume of fuel dispensed. This unit, also known as a measurer, is generally a mechanical positive displacement meter.

The function of a mechanical measurer is to convert the flow of the fuel into a rotary motion in which one complete revolution corresponds to a given volume of fuel passing through the measurer. In a known piston type measurer for example, the liquid from the pump of the dispenser is injected into two or four cylinders which are filled and emptied in succession by means of a dispensing slide valve device. The pistons drive a crankshaft whose angle of rotation is proportional to the volume of liquid that has passed through the cylinders. An optical or magnetic encoding system coupled to the rotary motion supplies an electrical signal made up of a series of pulses each of which corresponds to a volume measurement increment, for example 1 centiliter (cl).

Piston and cylinder volume meter technology is well established and proven but nevertheless has a number of drawbacks, namely:

many mechanical parts, close machining tolerances, large overall size, moving parts subject to wear by friction that must be compensated by periodic calibration, problems concerning the ability of the materials used to withstand the chemical constituents of fuels, mechanical noise, high internal volume so that it is not possible to meter a plurality of different products sequentially in the same meter.

OBJECTS AND SUMMARY OF THE INVENTION

An object of the present invention is to provide a meter for measuring the volume of a flowing fluid that remedies the drawbacks of prior art mechanical meters, in particular by limiting the number of moving parts.

This and other objects are attained in accordance with one aspect of the present invention which is directed to a meter for measuring the volume of a flowing fluid. The meter includes a viscosensitive unit through which said fluid flows under laminar flow conditions, a first fluidic oscillator in series with the viscosensitive unit, and a second fluidic oscillator shunting at least the viscosensitive unit. The viscosensitive unit and the fluidic oscillators are adapted to determine the viscosity of the fluid so as to apply to the fluid volume measured by the fluidic oscillators a correction that depends on the Reynolds number.

Accordingly, the volume meter of the invention has no moving parts, which eliminates all wear and noise problems. It is also of simple mechanical design, compact, economical, and insensitive to pressure variations and to vibrations. Finally, its small internal volume allows sequential metering of more than one fuel.

BRIEF DESCRIPTION OF THE DRAWINGS

The following description with reference to the accompanying drawings, given by way of non-limiting example, explains the invention and how it can be put into effect.

Fig, 1 is a schematic cross-sectional view of a fluidic oscillator.

DETAILED DESCRIPTION OF THE PREFERRED EMBODIMENTS

A fluidic oscillator is a solid state meter in which the flowing fluid whose volume is to be measured passes through a cavity designed to impart periodic oscillatory motion to the flow of fluid. To a first approximation the frequency of the oscillations of the fluid is proportional to the flowrate of the fluid through the oscillator. The accuracy obtained is on the order of ±2%. In many cases this accuracy is sufficient. However, in the case of fuels, current legislation requires the much higher accuracy of ±0.3%. It is therefore necessary to use a corrective term depending on the Reynolds number of the fluid in the oscillator. To determine the Reynolds number it is necessary to determine the viscosity of the fluid, which is done by the volume meter of the invention in accordance with the principle described in U.S. Pat. No. 6,073,483.

The well known general principle of a fluidic oscillator is to cause a fluid to flow into a cavity so designed that the fluid passing through it is subject to periodic oscillatory motion. There is a reliable relationship between the frequency of the oscillations and the flowrate through the cavity. An electronic device converts the periodic signal supplied by the fluidic oscillator into pulses which correspond to the volume measurement increment. Volume is measured directly by counting the pulses, with the fluidic oscillator constituting a volume meter.

Figure 1:
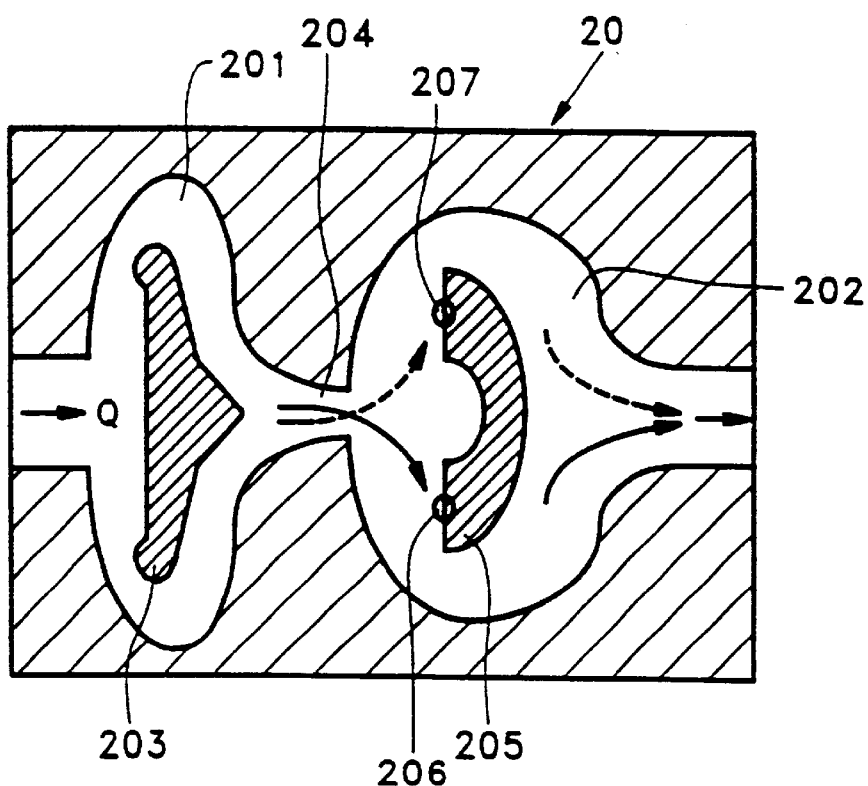

FIG. 1 shows a known fluidic oscillator 20 which comprises a first cavity 201 serving as a flow conditioner. The incoming fluid may be subject to internal speed distributions dependent on the installation and that may disrupt the measurement. The flow of fluid impinges on an obstacle 203 which orients the flow in a controlled fashion toward a calibrated slot 204 independently of the upstream pipework.

The slot 204 injects the fluid at high speed into a second cavity 202 containing a second obstacle 205 which diverts the flow alternately to the right (continuous arrow) or to the left (dashed line arrow). Fluid flows are created dispenser inside the cavity 202 that react on the high-speed jet, forcing it to change direction. The phenomenon is reversed periodically depending on the fluid flowrate Q. Detection of the change of direction of the jet by sensors 206, 207 enables the frequency F of the oscillations to be measured and thus the flowrate Q to be determined. For a given flowrate Q, the frequency F is perfectly stable, reproducible, and reliable. It is therefore possible to determine the volume of fluid dispensed corresponding to each individual oscillation. The sensors 206, 207 are preheated temperature sensors, for example, and variations in their resistance induced by variations in the speed of the fluid in contact with the sensor are detected. The sensors 206, 207 are supplied with a regulated current which heats them by the Joule effect to a temperature higher than that of the fluid. In this case the fluid jet evacuates the heat generated by the sensors.

To a first approximation the frequency F of a fluidic oscillator is proportional to the flowrate Q of the fluid:

$$F = KQ \tag{1}$$

K being a coefficient characteristic of the fluidic oscillator.

Figure 2:
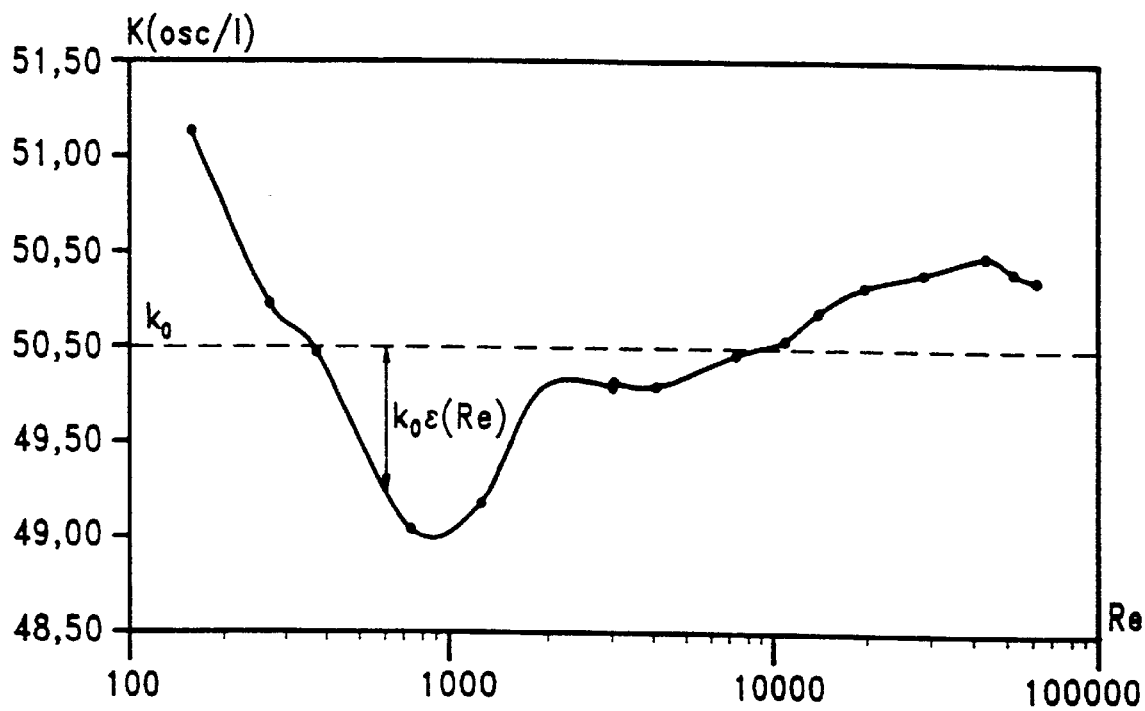
FIG. 2 is a graph showing how the number of oscillations per liter of the fluidic oscillator from FIG. 1 varies as a function of Reynolds number.

However, as indicated in FIG. 2, for a given flowrate Q the coefficient K from equation (1) depends on the Reynolds number Re of the oscillating cavity 202:

$$Re = Q/h\nu$$

where h is the height of the cavity and $\nu$ is the kinematic viscosity of the fluid.

The coefficient K can vary by up to ±2% as a function of Re, which is acceptable in a great many situations. However, in the case of measuring the volume of fuel dispensed by a dispenser, the authorities impose an accuracy of ±0.3%. The variations of K with Reynolds number can be represented by the equation:

$$K = Ko(1 + \epsilon(Re))$$

where Ko is an average value and $Ko\epsilon(Re)$ is the deviation relative to Ko for the Reynolds number Re. In FIG. 2, the value of Ko is 50 oscillations/liter.

Equation (1) can then be written:

$$F = Ko(1 + \epsilon(Re))Q \tag{2}$$

If qo is the average individual volume corresponding to one oscillation at frequency F (qo=1/Ko) and if q is the actual individual volume, with $\epsilon(Re)$ small compared to 1, equation (2) can be written:

$$Q = qo(1 - \epsilon(Re)) \tag{3}$$

Allowing for the spread of the coefficient K as a function of the Reynolds number Re therefore amounts to correcting the individual volume qo for each oscillation by the amount $qo\epsilon(Re)$.

For a given oscillating cavity, the Reynolds number depends essentially on viscosity, so it is essential to be able to measure the viscosity of the fluid in real time.

Figure 3:
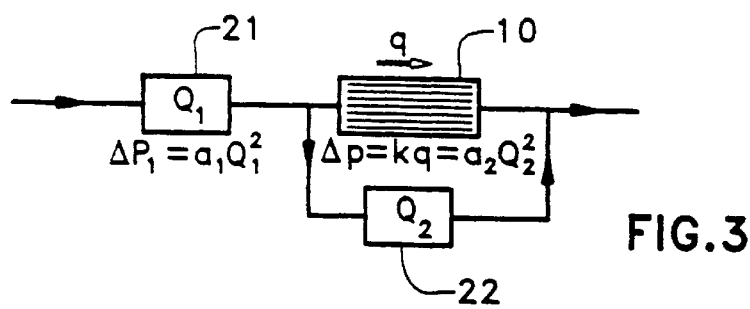
FIG. 3 is a diagram of a first embodiment of a volume meter of the invention.
Figure 4:
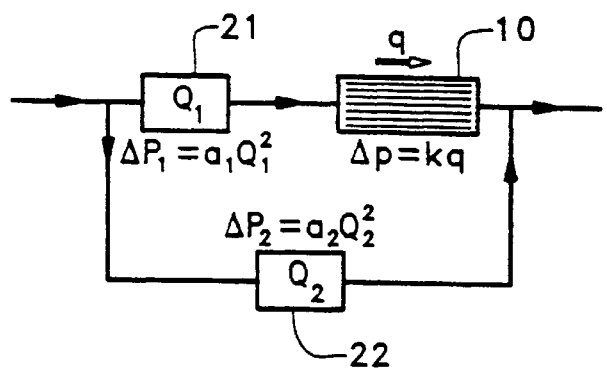
FIG. 4 is a diagram of a second embodiment of a volume meter of the invention.

To this end, and as shown in FIGS. 3 and 4, there is provided a meter for measuring the volume of a flowing fluid comprising:

a first viscosensitive unit 10 through which said fluid flows under laminar flow conditions, a first fluid oscillator 21 in series with said viscosensitive unit 10, and a second fluidic oscillator 22 shunting at least the viscosensitive unit (10), the viscosensitive unit 10 and said fluidic oscillators 21, 22 being adapted to determine the viscosity of the fluid.

The manner in which the volume meters from FIGS. 3 and 4 measure the viscosity of the fluid is explained in detail in the above-mentioned co-pending patent application. Briefly, in FIG. 3, in which the second fluidic oscillator 22 shunts only the viscosensitive unit 10, the dynamic viscosity $\mu$ is given by:

$$\mu = (a_2/k)x^2 Qt/(1-x) \tag{4}$$

where x is the ratio $Q_1/Q_2$ of the flowrates measured by the fluidic oscillators 21, 22, Qt is the total flowrate, here $Q_1$, and $a_2$ and k are parameters characteristic of the second fluidic oscillator 22 and of the viscosensitive unit 10, the ratio $(a_2/k)$ being determined by prior calibration. The kinematic viscosity $\nu$ is related to the dynamic viscosity $\mu$ by the equation $\nu = \mu/\rho$, $\rho$ being the density of the fluid.

In FIG. 4, in which the second fluidic oscillator 22 shunts the combination of the viscosensitive unit 10 plus the first fluidic oscillator 21, the dynamic viscosity $\mu$ of the fluid is given by the equation:

$$\mu = (1/k)(a_2 x^2 - a_1)Qt/(x+1) \tag{5}$$

where x is the ratio $Q_1/Q_2$ of the flowrates measured by the fluidic oscillators 21, 22, $Q_t$ is the total flowrate $Q_1 + Q_2$ and $Q_1$ is a parameter characteristic of the first fluidic oscillator 21, the ratios $a_1/k$ and $a_2/k$ being determined by prior calibration.

The viscosensitive unit 10 is adapted to assure laminar flow of the fluid throughout the range of flowrates envisaged. One embodiment of a viscosensitive unit of the above kind is the flashback arrestor used in fuel dispensers.

Figure 5:
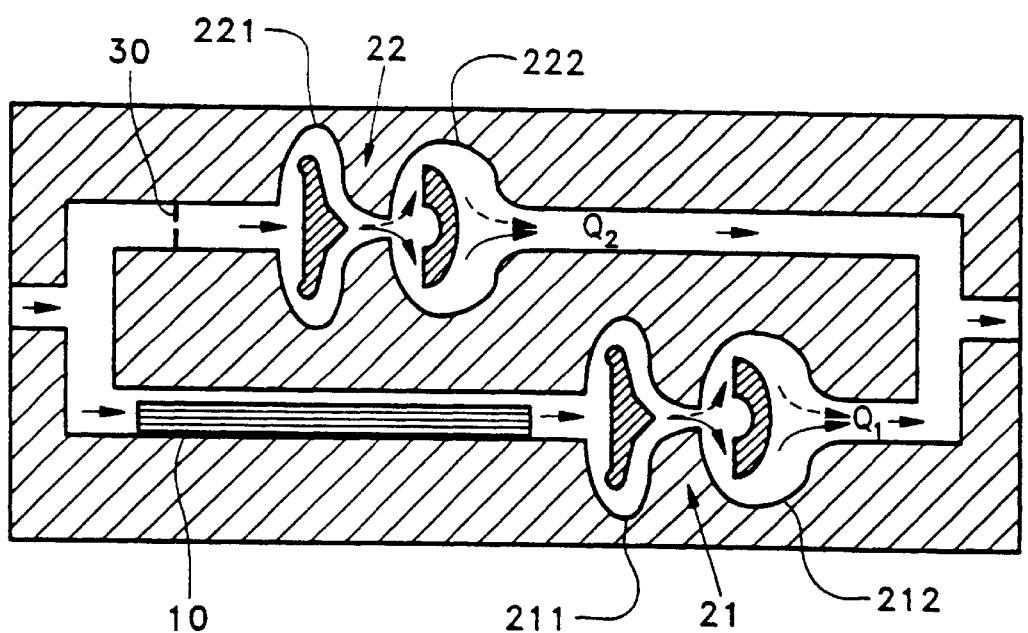
FIG. 5 is a schematic cross-sectional view of the volume meter from FIG. 4.

FIG. 5 shows one particular embodiment of the meter shown in diagrammatic form in FIG. 4. Note that a flowrate reducing diaphragm 30 has been disposed in series with the second fluidic oscillator 22 to balance the flowrates between the two branches. The effect of the diaphragm 30 is to increase the parameter $a_2$ of the second fluidic oscillator 22.

Figure 6:
FIG. 6 is a graph showing how the signal from the fluidic oscillator from FIG. 1 varies with time and also showing the corresponding signal from a signal shaping circuit.

FIG. 6 shows the signal $s_{osc}$ supplied directly by a fluidic oscillator. In the case of an oscillator with two sensors 206, 207 as shown in FIG. 1, the signal $s_{osc}$ is the differential signal from the two sensors. Regarding $s_{osc}$, there is shown a pulsed signal Imp deduced from $s_{osc}$ by an electronic signal shaping circuit known in itself. Each pulse of Imp corresponds to the actual individual volume q of the fluid and summing all the pulses of the actual individual volumes q gives the total volume of the fluid that has flowed.

The volume meters from FIGS. 3 and 4 operate in the following manner.

The fluid flowrates $Q_1$ and $Q_2$ across the fluidic oscillators 21, 22 are determined from the approximate equations:

$$Q_1 = q_{01} F1$$

and $$Q_2 = q_{02} F2$$

Knowing $Q_1$ and $Q_2$, x and $Q_t$ are known, from which the dynamic viscosity $\mu$, and thus the kinematic viscosity $\nu$, can be deduced using equations (4) and (5) applied either analytically or in the form of tables after calibration.

The corresponding Reynolds number can then be calculated for each fluidic oscillator, namely:

$$Re_1 = Q_1/h_1 \nu$$

and $$Re_2 = Q_2/h_2 \nu$$

Then, knowing the corrections $\epsilon_1(Re_1)$ and $\epsilon_2(Re_2)$ from calibration, it is possible to determine the actual individual volumes corresponding to one pulse of the signals $Imp_1$ and $Imp_2$:

$$q_1 = q_{01}(1-\epsilon_1(Re_1)) \quad q_2 = q_{02}(1-68_2(Re_2))$$

Figure 7:
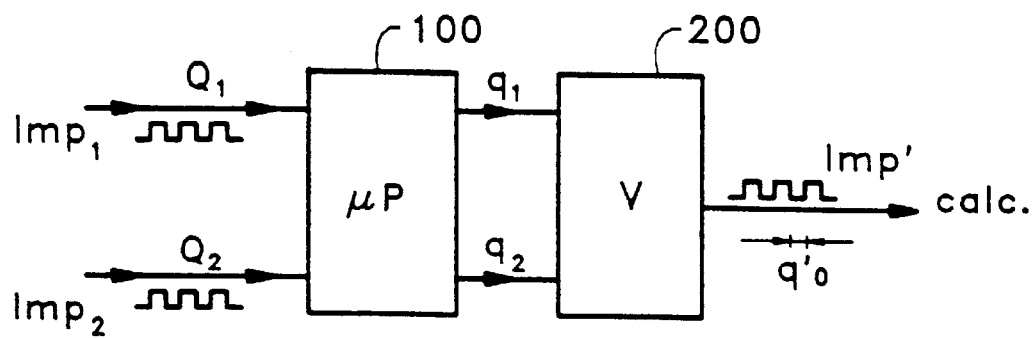
FIG. 7 is a block diagram of the means for correcting the measured volume as a function of Reynolds number.

The correction is applied by a microprocessor 100 shown in FIG. 7. A meter 200 sums pulse by pulse the actual individual volumes $q_1$ and $q_2$ to obtain the total volume of fluid that has flowed and each time an individual volume $q_0$, for example 1 cl, is metered the meter 200 supplies a pulse Imp' to a computer, such as the computer of a fuel dispenser, which then has only to count the pulses Imp' to determine the volume of fluid that has flowed. As an alternative to this, the meter 200 could also supply the cumulative total volume, sent periodically in encoded form.

Some authorities require the volume to be corrected for temperature. The volume of a fluid, and especially of a hydrocarbon, varies by approximately 0.1% per degree centigrade and, for temperature lying in the range −20° C. to 35° C., the relative variation in the volume of the fluid can be as great as 5%. The temperature sensors 206, 207 can then be used also to measure the temperature of the liquid, the volume being corrected by the microprocessor 100.

We claim:

1. A meter for measuring the volume of a flowing fluid, wherein said meter comprises:
    a viscosensitive unit through which said fluid flows under laminar flow conditions,
    a first fluidic oscillator in series with said viscosensitive unit, and having a fluid frequency output
    a second fluidic oscillator shunting at least the viscosensitive unit, and having a fluid frequency output and
    means coupled to said fluid frequency outputs of said first and second fluidic oscillators determining a measured fluid volume and a viscosity of the fluid, and for applying to the measured fluid volume a correction that depends on Reynolds number.

2. A meter according to claim 1, wherein the second fluidic oscillator shunts only the viscosensitive unit.

3. A meter according to claim 1, wherein the second fluidic oscillator shunts both the viscosensitive unit and the first fluidic oscillator.

4. A meter according to claim 1, wherein a diaphragm is disposed in series with at least one of the two fluidic oscillators.

5. A meter according to claim 1, wherein the fluidic oscillators are provided with preheated temperature sensors.

6. A meter according to claim 1, including means for correcting fluid volume as a function of temperature.

* * * * *

UNITED STATES PATENT AND TRADEMARK OFFICE
CERTIFICATE OF CORRECTION

PATENT NO.     : 6,279,386 B1
DATED          : August 28, 2001
INVENTOR(S)    : Nitecki et al.

It is certified that error appears in the above-identified patent and that said Letters Patent is hereby corrected as shown below:

<u>Title page,</u>
Item [22], Filed, change "Nov. 30, 1999" to -- Nov. 30, 1998 --.

Signed and Sealed this

Twenty-seventh Day of August, 2002

Attest:

JAMES E. ROGAN
Attesting Officer
Director of the United States Patent and Trademark Office